US009672653B2

United States Patent
Hart et al.

(10) Patent No.: US 9,672,653 B2
(45) Date of Patent: Jun. 6, 2017

(54) STEREO VIEWPOINT GRAPHICS PROCESSING SUBSYSTEM AND METHOD OF SHARING GEOMETRY DATA BETWEEN STEREO IMAGES IN SCREEN-SPACED PROCESSING

(71) Applicant: Nvidia Corporation, Santa Clara, CA (US)

(72) Inventors: G. Evan Hart, Bristow, VA (US); Cem Cebenoyan, Santa Clara, CA (US); Louis Bavoil, Courbevoie (FR)

(73) Assignee: Nvidia Corporation, Santa Clara, CA (US)

( * ) Notice: Subject to any disclaimer, the term of this patent is extended or adjusted under 35 U.S.C. 154(b) by 398 days.

(21) Appl. No.: 13/715,680

(22) Filed: Dec. 14, 2012

(65) Prior Publication Data
US 2014/0168232 A1   Jun. 19, 2014

(51) Int. Cl.
*G06T 15/00* (2011.01)
*G09G 3/00* (2006.01)
*G09G 5/36* (2006.01)
*G09G 5/397* (2006.01)
*H04N 13/00* (2006.01)

(52) U.S. Cl.
CPC .......... *G06T 15/005* (2013.01); *G09G 3/003* (2013.01); *G09G 5/363* (2013.01); *G09G 5/397* (2013.01); *H04N 13/0007* (2013.01); *G09G 2360/128* (2013.01)

(58) Field of Classification Search
None
See application file for complete search history.

(56) References Cited

U.S. PATENT DOCUMENTS

| | | | |
|---|---|---|---|
| 2004/0085310 A1* | 5/2004 | Snuffer | H04N 13/0495 345/419 |
| 2009/0088897 A1* | 4/2009 | Zhao et al. | 700/250 |
| 2010/0053416 A1* | 3/2010 | Chen et al. | 348/345 |
| 2011/0050944 A1* | 3/2011 | Nakamura | H04N 5/772 348/222.1 |
| 2012/0032950 A1* | 2/2012 | Lee et al. | 345/419 |

OTHER PUBLICATIONS

Ritschel, Tobias, et al., "Approximating Dynamic Global Illumination in Image Space", Siggraph 2009, 8 pages.
Ritschel, Tobias, et al., "Approximating Dynamic Global Illumination in Image Space", ACM 13D '09, Boston (MA), Feb. 27, 2009, 27 pgs.

\* cited by examiner

*Primary Examiner* — Michelle Chin
(74) *Attorney, Agent, or Firm* — Kevin Brown; Parker Justiss, P.C.

(57) ABSTRACT

A stereo viewpoint graphics processing subsystem and a method of sharing geometry data between stereo images in screen-space processing. One embodiment of the stereo viewpoint graphics processing subsystem configured to render a scene includes: (1) stereo frame buffers configured to contain respective pixel-wise rendered scene data for stereo images, and (2) a sharing decision circuit operable to determine when to share geometric data between the stereo frame buffers for carrying out screen-space effect processes to render the scene in the stereo images.

20 Claims, 3 Drawing Sheets

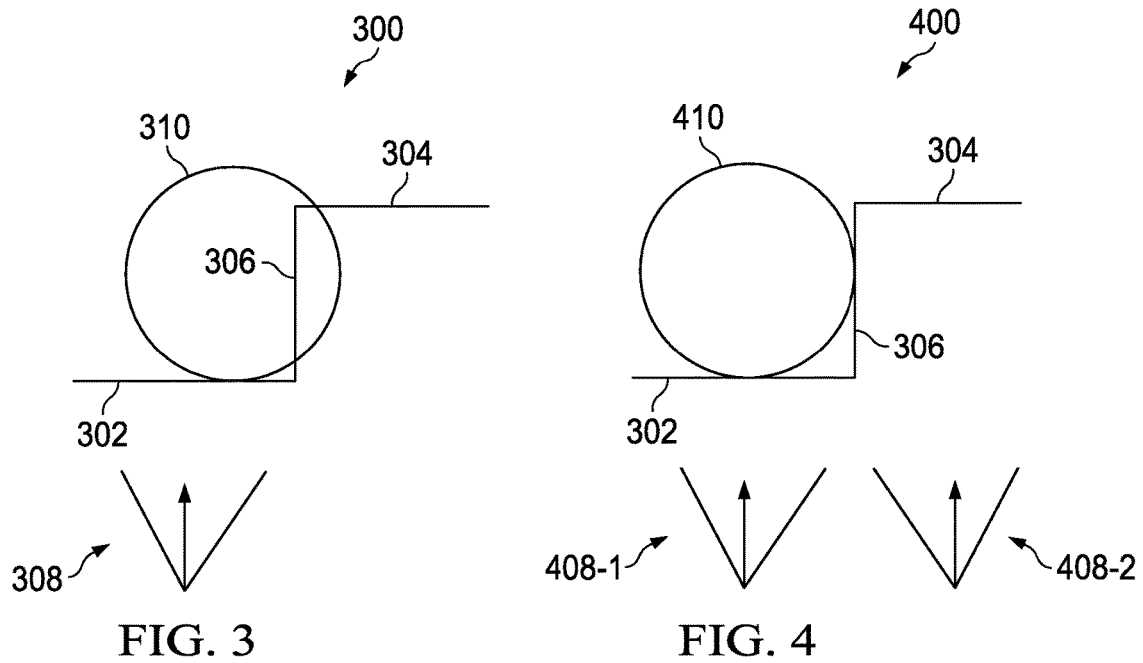
FIG. 3
FIG. 4
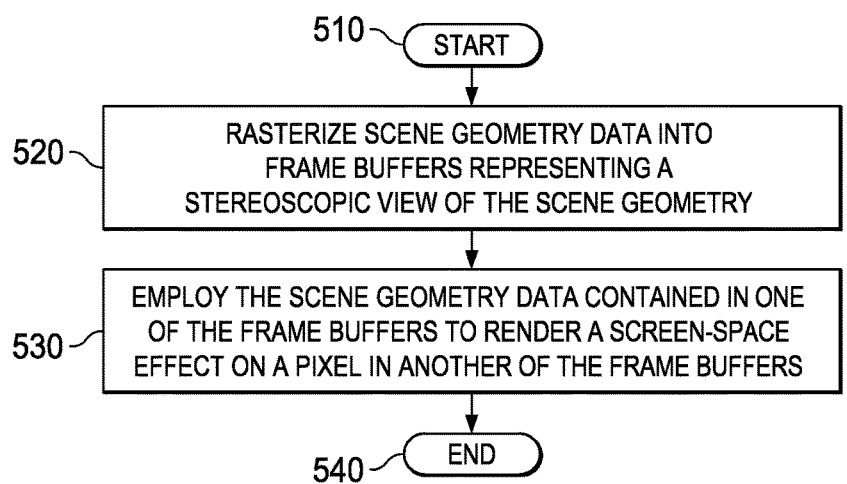
FIG. 5

STEREO VIEWPOINT GRAPHICS PROCESSING SUBSYSTEM AND METHOD OF SHARING GEOMETRY DATA BETWEEN STEREO IMAGES IN SCREEN-SPACED PROCESSING

TECHNICAL FIELD

This application is directed, in general, to computer graphics and, more specifically, to screen-space effects employing multiple viewpoints.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more two- or three-dimensional vertices. Each vertex may have additional scalar or vector attributes used to determine qualities such as the color, transparency, lighting, shading, and animation of the vertex and its associated geometric primitives. Scene geometry may also be approximated by a depth texture representing view-space Z coordinates of opaque objects covering each pixel.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

Many shading programs are executed in a stage of the "graphics pipeline" known as screen-space. Screen-space rendering is carried out pixel-by-pixel just before displaying a scene. Effects such as ambient occlusion, ambient illumination, depth-of-field, reflection and anti-aliasing are computationally expensive when performed during geometry rendering. In screen-space, complex geometries are decoupled from lighting phenomena, allowing screen-space shading programs to operate more efficiently with a minimal geometry data set. Screen-space rendering processes rely on data available in a geometry buffer, "G-buffer" or "frame buffer," which is generated during geometry rendering and rasterizing.

The frame buffer generally lacks the complete geometry, or complexity, of a three-dimensional scene. The pixel-wise representation of the scene often includes only visible surfaces, or those being nearest in the depth field. Scenes reconstructed in screen-space (from the frame buffer) sometimes experience artifacts near geometric discontinuities. The artifacts manifest as incorrect reflections and color bleeding and disoriented shadowing, among others, and result from an inability to consider off-screen surfaces.

This limitation of screen-space rendering can be overcome by additional processing. One such technique is depth peeling. Conventional screen-space processes have access to only the first depth in the pixel-wise depth buffer (a portion of the frame buffer). When using depth peeling, the first k depth values are stored in the frame buffer during rendering. The additional complexity is easily stored in the frame buffer and gives occluding objects a depth dimension otherwise unavailable in the conventional depth buffer. Shadows cast by these occluding "volumes" are more visually plausible than their two-dimensional counterparts. A similar technique, akin to ray-marching, is to sample the depth field along a line extending radially from the pixel being shaded. Yet another technique is even more duplicative: multiple viewpoints or "cameras." With multiple cameras, the scene is rendered from each camera, creating one or more largely redundant frame buffers to that of the primary viewpoint or "viewer camera." Additional cameras are distinctly separated from the viewer camera, for instance, rotated ninety degrees (90°) with respect to the object center, i.e., orthogonal. Two, three or even four additional cameras allow frame buffers to be packed with enough data to reconstruct the scene with great detail.

Each of these techniques lengthens the shading process, whether by adding data to the frame buffer, which must be retrieved in screen-space, by increased sampling, or simply by duplicating frame buffers all-together. With increased processing bandwidth in GPUs, many consider this a modest tradeoff for improved shading results. In real-time rendering, screen-space techniques are still good alternatives to processing effects during geometry rendering.

SUMMARY

One aspect provides a graphics processing subsystem configured to render a scene, including: (1) stereo frame buffers configured to contain respective pixel-wise rendered scene data for stereo images, and (2) a sharing decision circuit operable to determine when to share geometric data between the stereo frame buffers for carrying out screen-space effect processes to render the scene in the stereo images.

Another aspect provides a method of rendering a screen-space effect, including: (1) rasterizing scene geometry data into frame buffers representing a stereoscopic image of the scene geometry, and (2) employing the scene geometry data contained in one of the frame buffers in rendering a screen-space effect on a pixel in another of the frame buffers.

Yet another aspect provides a graphics processing subsystem configured to render a scene in stereo, including: (1) left eye and right eye frame buffers configured to contain respective pixel-wise rendered scene data for left eye and right eye images, (2) a sharing decision circuit operable to direct a sharing of geometric data between the left eye and right eye frame buffers, and (3) a screen-space resolver circuit operable to employ the sharing to carry out screen-space effect processes for each of the left eye and right eye images.

BRIEF DESCRIPTION

Reference is now made to the following descriptions taken in conjunction with the accompanying drawings, in which:

FIG. 3 is an illustration of one geometric ambiguity that may arise using a mono viewpoint;

FIG. 4 is another illustration of the geometry of FIG. 3 using stereo viewpoints; and FIG. 5 is a flow diagram of one embodiment of a method of sharing geometry data between stereo images in screen-space rendering.

DETAILED DESCRIPTION

Figure 1:
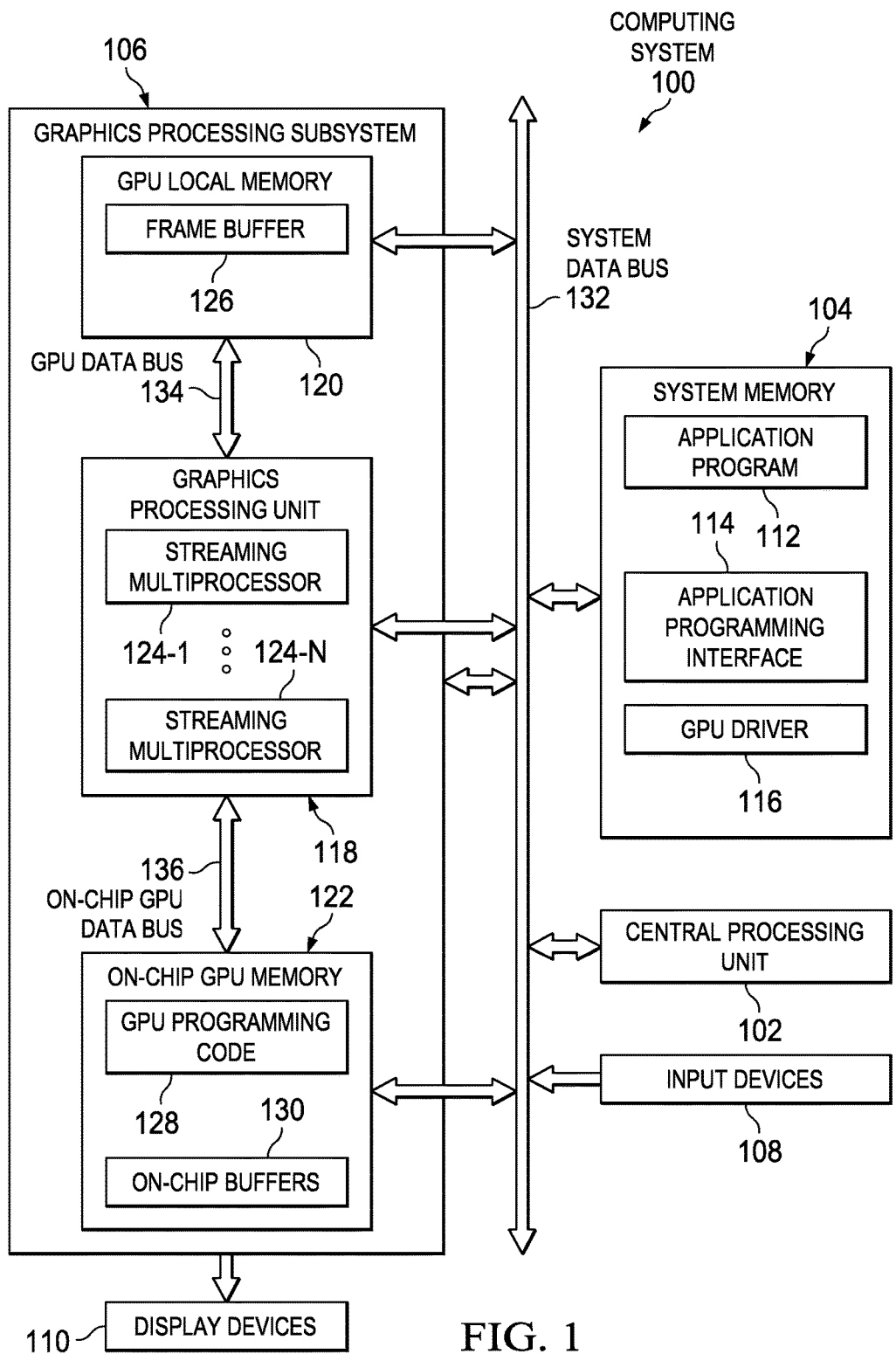
FIG. 1 is a computing system within which one or more embodiments of the stereo viewpoint GPU or method of sharing geometric data between stereo images may be embodied.

Before describing various embodiments of the stereo viewpoint graphics processing subsystem or method introduced herein, screen-space limitations, stereo rendering and the benefits of parallax in computer graphics will be generally described.

During geometry rendering of a scene, complex three-dimensional geometries are reduced to the visible surfaces and rasterized into pixel-by-pixel frame buffers. The frame buffers are carried into screen-space where the complexities are lost. Correct lighting and shading within a scene depends on these complexities. Therefore, in screen-space, where visibility and illumination are decoupled, reproduction of lighting and shading are merely coarse approximations of actual illumination.

The approximations often experience artifacts near discontinuities in the geometric data. When viewing a surface in a scene head on, there is no perception of the depth of that surface or the existence of any additional surface hidden from view. In reality, the surface is often a volume and there are often more surfaces or volumes beyond the visible plane. Light, from potentially numerous sources, inevitably collides with the hidden surfaces or volumes and occludes other surfaces, casting shadows, reflecting, refracting and creating many other lighting phenomena. The missing or poorly approximated phenomena are the artifacts.

Stereoscopic rendering, or simply stereo rendering, is a process by which a scene is rendered from two distinct viewpoints: a left eye viewpoint and a right eye viewpoint, as in normal binocular vision. The resulting stereoscopic images can then be displayed providing the illusion of depth to the viewer. Stereoscopic images may be displayed on a stereo display, where a left eye image is displayed for the left eye, and the right eye image is displayed for the right eye. Alternatively, stereo rendering may be extended to merge or fuse the stereoscopic images together, creating a single three-dimensional image. The three-dimensional image can then be displayed and viewed on a three-dimensional display using one of several three-dimensional systems, including anaglyphics, polarization, eclipse systems or other filtering techniques. The three-dimensional image often cannot be properly viewed through un-aided eyes. Most commercially available systems require the use of special glasses having the appropriate filtering or shutter characteristics to match the display. Otherwise, to the naked eye, the displayed image would appear distorted. Certain three-dimensional display systems are autostereoscopic, meaning no special headgear or glasses.

The display systems mentioned above are all two-dimensional representations that appear three-dimensional when viewed. Normal binocular vision achieves this through a process known as stereopsis, where the brain resolves the binocular disparity existing between the images perceived by each retina, due to their parallax, resulting in depth perception. Real three-dimensional displays go a step further, as in volumetric displays, holographic displays and integral imaging. These systems are also autostereoscopic, but display actual three-dimensional imagery that can be viewed from virtually any aspect without straining the eyes.

It is realized herein that stereo rendering yields sufficient geometric data to resolve illumination artifacts and to produce plausible illumination effects in screen-space. Stereo rendering creates two separate (stereoscopic, or simply "stereo") frame buffers (one for the left eye and one for the right eye) that are both required to create a proper stereo image. It is realized herein that effects applied in screen-space can leverage the stereo frame buffers to reduce the occurrence of illumination artifacts by recognizing ambiguities between the stereo frame buffers and sharing geometric data. It is further realized that little overhead computation cost is incurred by sharing geometric data between stereo frame buffers.

It is realized herein that the parallax of stereo vision fills geometric data gaps in an otherwise two-dimensional raster image. It is realized herein that filling those gaps improves the results of screen-space processes, including: ambient occlusion, ambient illumination, depth-of-field, screen-space reflection and post-process anti-aliasing.

It is realized herein that while carrying out screen-space processing on a pixel for a single image, a determination may be made as to whether geometric data for the stereo companion, or alternate, image can and should be used to resolve an ambiguity arising due to off-screen surfaces or volumes that could possibly contribute to illumination of the pixel. It is realized herein that such determination may be made by a comparison between the stereo frame buffers. It is also realized herein that such determination may manifest as a screen-space sampling scheme that, for processing the pixel, takes a percentage of its necessary samples from the alternate frame buffer, or alternate viewpoint. It is realized herein the percentage of samples taken from the alternate frame buffer can be a fixed percentage or stochastically determined during processing. It is realized herein that screen-space processing of the blend of screen-space samples from each of the stereo images acts as an effective fusion of the two stereo images, yielding an autostereoscopic three-dimensional illumination effect.

Having described various novel realizations, a computing system within which the stereo viewpoint graphics processing subsystem and method introduced herein may be embodied or carried out will be described.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) employed to store programming instructions and data for processing by the CPU 102 and the graphics processing subsystem 106. The graphics processing subsystem 106 receives instructions transmitted by the CPU 102 and processes the instructions to render and display graphics images on the display devices 110.

As also shown, the system memory 104 includes an application program 112, an application programming interface (API) 114, and a graphics processing unit (GPU) driver 116. The application program 112 generates calls to the API 114 to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having generally described a computing system within which the stereo viewpoint graphics processing subsystem or method of sharing geometry data between stereo images may be embodied or carried out, various embodiments of the stereo viewpoint graphics processing subsystem and method introduced herein will be described.

Figure 2:
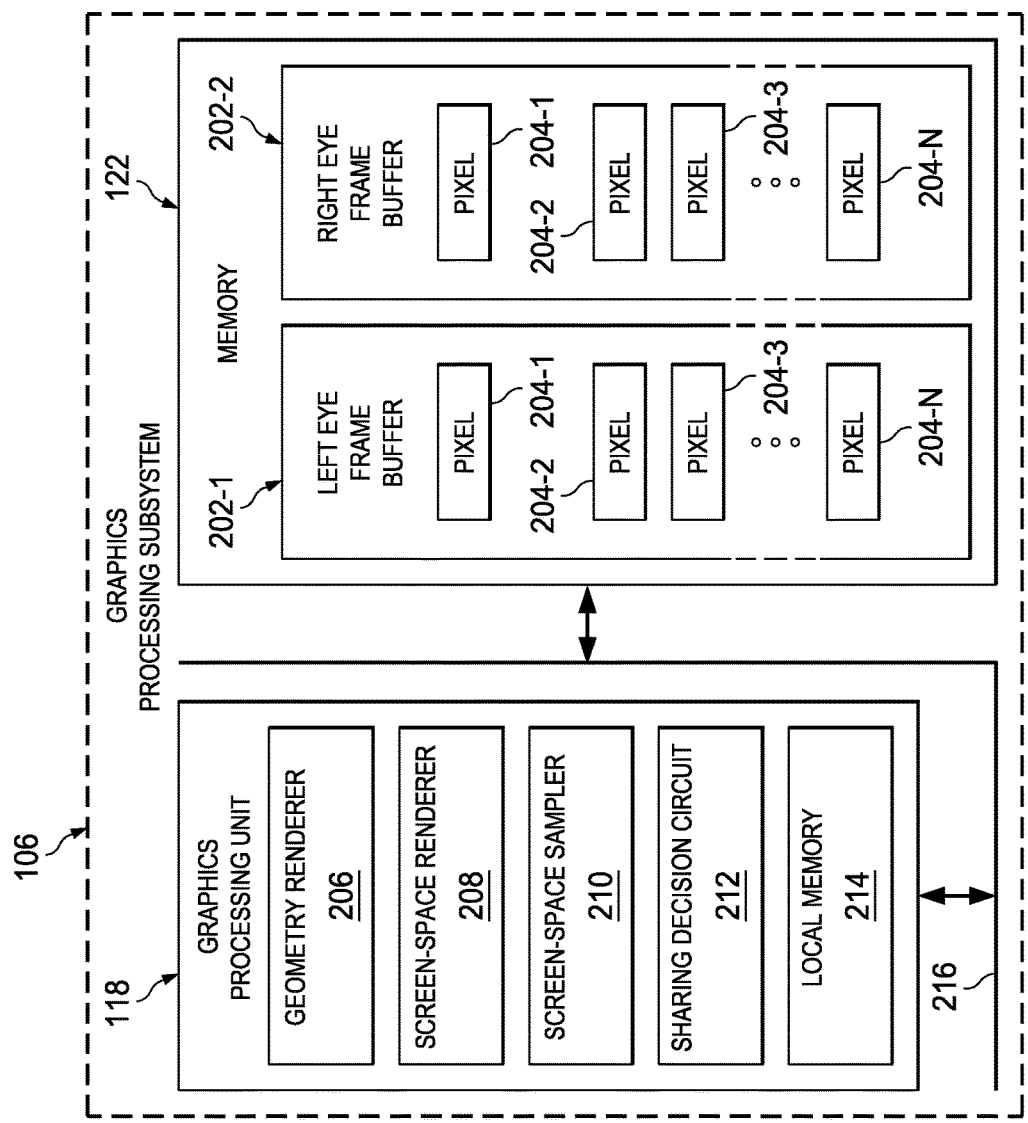
FIG. 2 is a block diagram of one embodiment of a graphics processing subsystem configured to employ stereo images in screen-space rendering.

FIG. 2 is a block diagram of one embodiment of the graphics processing subsystem 106 of FIG. 1. Graphics processing subsystem 106 is configured to employ stereo images for screen-space rendering processes. Graphics processing subsystem 106 includes GPU 118 and memory 122, both of FIG. 1. Memory 122 is configured to contain a left eye frame buffer 202-1 and a right eye frame buffer 202-2. Each of frame buffers 202-1 and 202-2 includes pixel-by-pixel representations of geometry data, pixels 204-1 through 204-N, for a rasterized scene.

GPU 118 includes a geometry renderer 206, a screen-space renderer 208, a screen-space sampler 210, a sharing decision circuit 212 and a local memory 214. GPU 118 and memory 122 are coupled by a data bus 216. In alternate embodiments the frame buffers 202-1 and 202-2 may be held in local memory 214 and data bus 216 and memory 122 are unnecessary.

In the embodiment of FIG. 2, frame buffers 202-1 and 202-2 are populated with geometry data by the geometry renderer 206. This occurs during geometry rendering of the respective stereo images. Once the scene is rasterized and the left eye frame buffer 202-1 and right eye frame buffer 202-2 are formed, screen-space processing begins. Screen-space effects are carried out by screen-space renderer 208, including: ambient occlusion, ambient illumination, depth-of-field, reflection and post-process anti-aliasing. Certain screen-space effects, ambient occlusion for instance, employ screen-space samples generated by screen-space sampler 210. In screen-space, while processing an effect for a given pixel 204-n for one of the two stereo images, screen-space sampler 210 is operable to sample either of the stereo frame buffers 202-1 and 202-2 about the given pixel 204-n. Effects like ambient occlusion employ surface characteristics of nearby surfaces and volumes to produce the effect. Other screen-space effects require only the surface characteristics of the given pixel 204-n being processed; no screen-space samples are required.

Sharing decision circuit 212 decides when and how geometry data held in the stereo frame buffers 202-1 and 202-2 is shared between screen-space processes for the given pixel 204-n in either the stereo images. In certain embodiments the decision is made deterministically by comparing geometry data between the left eye frame buffer 202-1 and right eye frame buffer 202-2 for the given pixel 204-n. The sharing decision circuit 212 of certain embodiments would recognize ambiguities in the depth field between the left eye image and right eye image by comparing the depth buffer (Z-buffer) values for the given pixel 204-n. Such a comparison may be made by transforming the depth vector from the left eye Z-buffer into a world space reference frame, or some other reference frame common to both of the stereo images. From the common reference frame, the depth vector may then be transformed into the right eye reference frame, where it can be compared to the depth vector from the right eye Z-buffer. The comparison yields an indicator of possible occlusion experienced from one viewpoint, revealed by the parallax between the two stereo viewpoints.

In alternate embodiments, the sharing decision circuit 212 makes its decision statistically. This approach is effective for effects employing screen-space samples. While processing an effect for the given pixel 204-n in one of the stereo images, or a "correlating" image, screen-space sampler 210 takes a percentage of the necessary screen-space samples from the correlating frame buffer, and the remaining of the necessary screen-space samples are taken from the "alternate" frame buffer. In certain embodiments, the ratio of correlating to alternate image samples is fixed. In other embodiments, the ratio is determined stochastically based on an evaluation of the geometry data.

FIG. 3 is an illustration of a scene 300 having a mono viewpoint 308. The scene 300 contains surfaces 302, 304 and 306. Given mono viewpoint 308, scene 300 contains an occluded portion 310. Included in that occluded portion 310 is surface 306. Mono viewpoint 308 cannot see surface 306. Surface 306 cannot be resolved in screen-space by mono viewpoint 308 and therefore consequential illumination effects of surface 306 cannot be rendered in screen-space.

FIG. 4 is an illustration of a scene 400 having stereo viewpoints 408-1 and 408-2. The scene 400 also contains surfaces 302, 304 and 306 of FIG. 3 and a different occluded portion 410. The additional viewpoint, viewpoint 408-2 is positioned such that surface 306 is visible, while it remains hidden with respect to viewpoint 408-1. Occluded portion 410 is entirely behind surfaces 302, 304 and 306. In screen-space, surface 306 can be resolved via the image taken from the viewpoint 408-2. Therefore, illumination effects due to surface 306 may be rendered in screen-space for the image taken from viewpoint 408-1 by sharing the geometry data of surface 306 from the image taken from viewpoint 408-2 with the screen-space rendering process for the image taken from the viewpoint 408-1.

FIG. 5 is one embodiment of a method of sharing geometry data between stereo images for rendering an effect in screen-space for one of the stereo images. The method begins in a start step 510. At step 520, scene geometry is rasterized into stereo frame buffers: a correlating frame buffer and an alternate frame buffer, with respect to the one of the stereo images. The scene geometry data contained in the alternate frame buffer is employed at a step 530 to render a screen-space effect on a pixel in the one of the stereo images. The method ends in an end step 540.

In certain embodiments, employing the scene geometry data of the alternate frame buffer includes a comparison of values between the correlating and alternate frame buffers. In other embodiments, employing the scene geometry data of the alternate frame buffer includes sampling the scene geometry data of the alternate frame buffer for use in rendering an effect for the one of the stereo images.

Those skilled in the art to which this application relates will appreciate that other and further additions, deletions, substitutions and modifications may be made to the described embodiments.

What is claimed is:

1. A graphics processing subsystem configured to render a scene, comprising:
   a left eye viewpoint frame buffer and a right eye viewpoint frame buffer configured to contain respective pixel-wise rendered scene data for left eye viewpoint and right eye viewpoint stereo images; and
   a sharing decision circuit operable to determine when to employ a combination of geometric data of a pixel contained in said left eye viewpoint frame buffer and geometric data of said pixel contained in said right eye viewpoint frame buffer for carrying out screen-space effect processes on said pixel to render said scene in both said left eye viewpoint and said right eye viewpoint stereo images.

2. The graphics processing subsystem recited in claim 1 wherein said left eye viewpoint frame buffer and said right eye viewpoint frame buffer are configured to contain depth-of-field data of said scene.

3. The graphics processing subsystem recited in claim 1 wherein said sharing decision circuit is configured to determine when to employ said geometric data by testing for per-pixel ambiguities between said left eye viewpoint and said right eye viewpoint frame buffers.

4. The graphics processing subsystem recited in claim 1 wherein said graphics processing subsystem further comprises a screen-space sampling circuit operable to sample both of said left eye viewpoint and said right eye viewpoint frame buffers for carrying out said screen-space effect process for each one of said left eye viewpoint and said right eye viewpoint stereo images.

5. The graphics processing subsystem recited in claim 4 wherein said sharing decision circuit is configured to share a percentage of screen-space samples generated by said screen-space sampling circuit between said screen-space effect processes for said each of said left eye viewpoint and said right eye viewpoint stereo images.

6. The graphics processing subsystem recited in claim 5 wherein said percentage of screen-space samples is stochastically determined.

7. The graphics processing subsystem recited in claim 1 wherein said screen-space effect processes are ambient occlusion processes.

8. A method of rendering a screen-space effect, comprising:
- rasterizing scene geometry data into left eye viewpoint and right eye viewpoint frame buffers representing stereoscopic images of said scene geometry; and
- employing said scene geometry data contained in both said left eye viewpoint and said right eye viewpoint frame buffers in rendering a screen-space effect on a pixel in each one of said left eye viewpoint and said right eye viewpoint frame buffers.

9. The method recited in claim 8 wherein said stereoscopic images are left eye and right eye images.

10. The method recited in claim 8 further comprising testing for ambiguities between said left eye viewpoint and said right eye viewpoint frame buffers before carrying out said employing.

11. The method recited in claim 8 wherein said employing includes taking screen-space samples from said left eye viewpoint and said right eye viewpoint frame buffers about said pixel.

12. The method recited in claim 11 wherein said taking comprises taking a stochastically determined percentage of said screen-space samples.

13. The method recited in claim 8 wherein said screen-space effect is ambient illumination.

14. The method recited in claim 8 wherein said scene geometry data comprises depth-of-field data.

15. A graphics processing subsystem configured to render a scene in stereo, comprising:
- left eye and right eye frame buffers configured to contain respective pixel-wise rendered scene data for left eye and right eye images;
- a sharing decision circuit operable to direct a sharing of geometric data of a pixel in said left eye frame buffer and geometric data of said pixel in said right eye frame buffer; and
- a screen-space resolver circuit operable to employ said geometric data in both said left eye frame buffer and said right eye frame buffer to carry out screen-space effect processes for said pixel for each of said left eye and right eye images.

16. The graphics processing subsystem recited in claim 15 wherein said left eye and right eye frame buffers are configured to contain depth-of-field data of said scene.

17. The graphics processing subsystem recited in claim 15 wherein said sharing decision circuit is configured to test for per-pixel ambiguities between said left eye and right eye frame buffers.

18. The graphics processing subsystem recited in claim 15 wherein said screen-space resolver circuit comprises a screen-space sampling circuit operable to generate samples of said left eye and right eye frame buffers according to said sharing.

19. The graphics processing subsystem recited in claim 18 wherein said sharing decision circuit is configured to share a fixed percentage of samples generated by said screen-space sampling circuit between said screen-space effect processes for each of said left eye and right eye images.

20. The graphics processing subsystem recited in claim 15 wherein said screen-space effect processes are ambient occlusion processes.

* * * * *